(12) United States Patent
Pufahl et al.

(10) Patent No.: US 12,327,559 B2
(45) Date of Patent: Jun. 10, 2025

(54) MULTIMODAL RESPONSES

(71) Applicant: GOOGLE LLC, Mountain View, CA (US)

(72) Inventors: April Pufahl, Mountain View, CA (US); Jared Strawderman, San Jose, CA (US); Harry Yu, San Francisco, CA (US); Adriana Olmos Antillon, San Francisco, CA (US); Jonathan Livni, San Francisco, CA (US); Okan Kolak, Sunnyvale, CA (US); James Giangola, Mountain View, CA (US); Nitin Khandelwal, Sunnyvale, CA (US); Jason Kearns, Oakland, CA (US); Andrew Watson, Zurich (CH); Joseph Ashear, Redwood City, CA (US); Valerie Nygaard, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/430,253

(22) Filed: Feb. 1, 2024

(65) Prior Publication Data

US 2024/0169989 A1 May 23, 2024

Related U.S. Application Data

(63) Continuation of application No. 17/515,901, filed on Nov. 1, 2021, now Pat. No. 11,935,530, which is a
(Continued)

(51) Int. Cl.
*G10L 15/22* (2006.01)
*G06F 1/16* (2006.01)
*G06F 3/16* (2006.01)

(52) U.S. Cl.
CPC ............ *G10L 15/22* (2013.01); *G06F 1/1694* (2013.01); *G06F 3/167* (2013.01);
(Continued)

(58) Field of Classification Search
None
See application file for complete search history.

(56) References Cited

U.S. PATENT DOCUMENTS 8,370,160 B2  2/2013  Pearce
8,386,260 B2  2/2013  Engelsma
(Continued)

FOREIGN PATENT DOCUMENTS

CN  101689187  3/2010
CN  101911064  12/2010
(Continued)

OTHER PUBLICATIONS

Chinese patent office office action dated Jun. 23, 2023 for CN201910826487. (Year: 2023).*
(Continued)

*Primary Examiner* — Richard Z Zhu
(74) *Attorney, Agent, or Firm* — Gray Ice Higdon

(57) ABSTRACT

Systems, methods, and apparatus for using a multimodal response in the dynamic generation of client device output that is tailored to a current modality of a client device is disclosed herein. Multimodal client devices can engage in a variety of interactions across the multimodal spectrum including voice only interactions, voice forward interactions, multimodal interactions, visual forward interactions, visual only interactions etc. A multimodal response can include a core message to be rendered for all interaction types as well as one or more modality dependent components to provide a user with additional information.

16 Claims, 9 Drawing Sheets

Related U.S. Application Data continuation of application No. 16/251,982, filed on Jan. 18, 2019, now Pat. No. 11,164,576.

(60) Provisional application No. 62/726,947, filed on Sep. 4, 2018.

(52) U.S. Cl.
CPC .......................... *G06F 2203/0381* (2013.01); *G10L 2015/223* (2013.01); *G10L 2015/225* (2013.01); *H04M 2203/251* (2013.01); *H04M 2203/253* (2013.01)

(56) References Cited

U.S. PATENT DOCUMENTS

| | | | |
|---|---|---|---|
| 8,977,965 | B1 | 3/2015 | Ehlen et al. |
| 9,443,519 | B1 | 9/2016 | Bakshi et al. |
| 9,507,439 | B2 | 11/2016 | Yoon |
| 9,690,542 | B2* | 6/2017 | Reddy .................. G06F 9/451 |
| 10,031,549 | B2 | 7/2018 | Costa |
| 10,043,516 | B2 | 8/2018 | Saddler et al. |
| 10,134,397 | B2 | 11/2018 | Bakshi |
| 10,671,428 | B2 | 6/2020 | Zeitlin |
| 11,200,893 | B2* | 12/2021 | Kirazci ................ G10L 15/22 |
| 11,217,240 | B2 | 1/2022 | Huber |
| 2003/0167167 | A1* | 9/2003 | Gong .................... G10L 15/22 704/250 |
| 2006/0072542 | A1 | 4/2006 | Sinnreich et al. |
| 2009/0182562 | A1 | 7/2009 | Caire |
| 2012/0109868 | A1* | 5/2012 | Murillo ................ G06F 21/84 706/46 |
| 2012/0198339 | A1 | 8/2012 | Williams et al. |
| 2013/0235073 | A1* | 9/2013 | Jaramillo .............. G09G 5/00 345/619 |
| 2016/0179908 | A1 | 6/2016 | Johnston et al. |
| 2016/0198988 | A1 | 7/2016 | Bhavaraju et al. |
| 2016/0299959 | A1 | 10/2016 | Sankar et al. |
| 2017/0289766 | A1* | 10/2017 | Scott .................... H04W 8/005 |
| 2017/0329573 | A1 | 11/2017 | Mixter |
| 2018/0329677 | A1 | 11/2018 | Gruber et al. |
| 2020/0075002 | A1 | 3/2020 | Pufahl et al. |
| 2020/0098368 | A1 | 3/2020 | Lemay et al. |
| 2022/0051675 | A1 | 2/2022 | Pufahl et al. |
| 2023/0026521 | A1* | 1/2023 | Gray .................... H04W 4/38 |
| 2023/0343330 | A1* | 10/2023 | Machanavajhala ..... G10L 15/22 |

FOREIGN PATENT DOCUMENTS

| | | |
|---|---|---|
| CN | 102340649 | 2/2012 |
| CN | 102818913 | 12/2012 |
| CN | 203135171 | 8/2013 |
| CN | 104423829 | 3/2015 |
| CN | 104618206 | 5/2015 |
| CN | 105721666 | 6/2016 |
| CN | 106025679 | 10/2016 |
| CN | 107423809 | 12/2017 |
| CN | 108062213 | 5/2018 |
| CN | 108106541 | 6/2018 |
| CN | 108197329 | 6/2018 |
| WO | 2012103321 | 8/2012 |
| WO | 2017197010 | 11/2017 |

OTHER PUBLICATIONS

Translation of Chinese patent office office action dated Jun. 23, 2023 for CN201910826487. (Year: 2023).*
China National Intellectual Property Administration; Notice of Grant issued in Application No. 201910826487.1; 4 pages; dated Nov. 20, 2023.
China National Intellectual Property Administration; Notification of Second Office Action issued in Application No. 201910826487.1; 17 pages; dated Jun. 30, 2023.
China National Intellectual Property Administration; Notification of First Office Action issued in Application No. 201910826487.1; 27 pages; dated Dec. 5, 2022.
Google Developers; Finding the Right Voice Interactions for Your App (Google I/O '17) https:/www.youtube.com/watch?v=0PmWruLLUoE&t=4s May 18, 2017.
Google Developers; Defining Multimodal Interactions One Size Does Not Fit All (Google I/O '17) https://www.youtube.com/watch?v=fw27RFHP2tc&t=1s May 18, 2017.
Google Developers; Design Actions for the Google Assistant beyond smart speakers (Google I/O '18) https://www.youtube.com/watch?v=JDakZMIXpQo&t=623s May 9, 2018.

* cited by examiner

MULTIMODAL RESPONSES

BACKGROUND

An automated assistant (also known as a "personal assistant", "mobile assistant", etc.) can be implemented on a multimodal client device and/or on one or more remote computing devices, such as computing device(s) in "the cloud" that are connected to the multimodal client device via a network. Multimodal client devices can provide a user with multiple modes of interacting with the device. More particularly, a multimodal device has several modes available for a user to input data to the device and/or several modes available for a device to render output to a user.

For example, user input to a multimodal device can include spoken input (e.g., a user speaking), textual input (e.g., a user typing on a keyboard, a user entering text on a touch sensitive screen, etc.), gesture input (e.g., user hand motions, user gaze, user head movements, etc.), haptic input (e.g., applying a variety of forces to a client device such as squeezing a client device, picking up a client device, shaking a client device, placing a client device in a particular orientation, etc.), as well as other types of input (e.g., pressing a physical button on a client device, clicking a button in a user interface with a mouse, performing actions with a mouse such as using a mouse scroll wheel to move information on a screen up and/or down, etc.), etc. Similarly, a multimodal device can render output for a user in many ways including audio output (e.g., generating output using a speaker for a user to listen to), visual output (e.g., displaying text, images, video, etc. on a screen, flashing a light on a client device on and off, changing colors of a light on a device, etc.), haptic output (e.g., causing a client device to vibrate), etc.

SUMMARY

This disclosure relates to systems, methods, and apparatus for using a multimodal response in the dynamic generation of client device output that is tailored to a current modality of a client device. The current modality of a client device can be one of a plurality of candidate modalities within a multimodal spectrum, and can indicate current methods of user interface input and/or client device output to be utilized. In some implementations, the multimodal spectrum of candidate modalities includes voice only interactions, voice forward interactions, multimodal interactions (also referred to as "intermodal interactions"), visual forward interactions, visual only interactions, etc. A client device can utilize one or more modalities, for example a client device utilizing voice only interactions, voice forward interactions, multimodal interactions, and visual only interactions. In some implementations, the current modality of the client device can be determined based on sensor data from one or more sensors of the client device and/or based on selection of the modality via user interface input of a user of the client device. For example, a multimodal client device can determine its current modality using sensor data from one or more sensors such as a camera, an inertial measurement unit ("IMU"), a gyroscope, a positioning system (e.g. Global Positioning System ("GPS")), a microphone, a proximity sensor, a pressure sensor, etc.

The client device can use its modality as well as a variety of other information including: user interface input, one or more modalities of user interface input, the type of the client device, the location of the client device, the location of the user with respect to the client device, etc., to dynamically generate client output, using a multimodal response, by selecting one or more portions of the multimodal response corresponding to the current client device modality. A multimodal response in accordance with many implementations can include a core message as well as modality dependent additional information.

For example, spoken user interface input to a multimodal client device can indicate a client action such as adjusting the set/desired temperature of a networked smart thermostat (e.g., user interface input such as "increase temperature by five degrees"). A multimodal response for rendering output for a client device action of adjusting a thermostat temperature can include a core message, such as confirming the desired temperature has been adjusted. The current modality of the client device, as well as a variety of other information, can determine if this confirmation is rendered as audio output, as visual output, as both audio and visual output, etc. Similarly, modality dependent additional information can provide additional output to be rendered via the client device. For example, a visual output can indicate the new set temperature, as well as the current temperature of the room. Additional visual output for use in one or more device modalities can indicate a variety of information such as an estimated time to reach the new temperature, the name of the associated smart thermostat, the temperature outside, etc. Similarly, additional audio output for use in one or more device modalities can indicate a variety of information to be rendered by the client device such as the new temperature, the current temperature, an estimation of how long it will take to reach the desired temperature, etc.

In many implementations, a client device can dynamically select portions of a multimodal response to render output for a respective modality of a variety of modalities. For example, a portion of the multimodal response can be selected for a voice only interaction, and a different portion of the multimodal response can be selected for a visual only interaction. As another example, one or more visual components of the multimodal response can be rendered via the client device in a voice forward interaction while conversely, no visual components of the multimodal response will be rendered via the client device in a voice only interaction.

In many implementations, a single multimodal response that can be utilized to generate client device output for any one of a plurality of candidate modalities can provide storage efficiencies relative to multiple separate responses that are each tailored to a single corresponding modality. For example, the single multimodal response used in dynamically generating output for many device modalities can be stored in a smaller portion of memory or other data structure, as compared to storing individual device responses for each modality type. For instance, a voice forward interaction can contain the same rendered audio output as a multimodal interaction. The audio output extracted from the same multimodal response for both the voice forward interaction and the multimodal interaction, can reduce memory storage requirements compared to storing the same audio output in both a voice forward interaction response as well as a multimodal interaction response.

Additionally or alternatively, a single multimodal response can provide computational efficiencies and/or reduced latency in client device output generation relative to multiple separate responses that are each tailored to a single corresponding modality. For example, having single multimodal responses in lieu of separate responses that are each tailored to a single corresponding modality can reduce the size of an index and/or other data structure utilized in determining output to render in response to a user input, thereby enabling faster and/or more efficient retrieval of the response. Also, for example, in some implementations a multimodal response can be transmitted to a client device from a remote server, and the client device itself can generate, based on the multimodal response, output(s) to render in response to a user input. Transmitting a single multimodal response (compared to responses for each modality interaction type) can enable a client device to quickly switch between interaction types without having to request and wait to receive a response for an additional interaction type. For instance, a multimodal client device such as a cellular telephone can be positioned screen side down while a user is engaging in a voice only interaction. If the user picks up the cellular telephone and looks at the screen, the current device modality can change, for example, to a multimodal interaction. The multimodal client device can select different portions of the multimodal response and continue to render output without having to wait to receive a separate multimodal interaction response from the remote server.

Moreover, dynamic generation of client device output that is tailored to a current modality of a client device can additionally or alternatively directly result in various other efficiencies. For example, by generating client device output that is specifically tailored to a current modality, client device resources are not wasted in unnecessarily rendering various content that is not needed for the current modality. For instance, assume a client device that is a mobile phone and has a current modality of "voice only" based on sensor data indicating the phone is "face down". Utilizing techniques disclosed herein, only audible output can be provided in the "voice only" modality, thereby preventing the unnecessary simultaneous rendering of related visual output. Also, for example, dynamic generation of client device output that is tailored to a current modality can reduce a quantity of user inputs and/or enable the automated assistant to more efficiently assist the user in performance of a technical task. For example, during a multi-turn dialog session between a user and an automated assistant where output is tailored to the current modality, the output can be dynamically tailored to most efficiently convey information to the user in view of the modality/modalities during the dialog session.

Additionally or alternatively, client device errors can be handled in different ways depending on the current modality of a device. For example, in a voice only interaction, a client device can render output directing the user to repeat their spoken input and/or render output indicating the system has encountered an error. Similarly, a client device using a visual only interaction can visually render error handling such as rendering visual output requesting the user repeat user input and/or render visual output indicating a backend server error has occurred. Multimodal interactions, voice forward interactions, and/or visual forward interactions can handle errors using a combination of voice only and visual only error handling. In many implementations, error handling can be incorporated as part of a multimodal response for a client action that can initiate the error. In other implementations, error handling can be included as part of a separate multimodal response.

The above description is provided as an overview of some implementations disclosed herein. Additional description of these and other implementations is set forth in more detail herein.

In some implementations, a method is provided that includes determining a client device action based on one or more instances of user interface input by a user of a multimodal client device. The method further includes determining, based at least in part on sensor data from one or more sensors of the multimodal client device, a current client device modality of the multimodal client device, wherein the current client device modality is one of a plurality of discrete client device modalities for the multimodal client device, and wherein the sensor data based on which the current client device modality is determined is in addition to any sensor data generated by the one or more instances of user interface input. The method further includes generating client device output for the client device action using a multimodal response, wherein the multimodal response includes components of output for the client device action for the plurality of discrete client device modalities, and wherein generating the client device output comprises selecting one or more of the components of the multimodal response which correlate with the current client device modality. The method further includes causing the client device output to be rendered by one or more user interface output devices of the multimodal client device.

These and other implementations of the technology described herein can include one or more of the following features.

In some implementations, the multimodal response is received by the multimodal client device from a remote server, and generating the client device output is by the multimodal client device. In some of those implementations, the method further includes the multimodal response received by the multimodal client device from the remote server in response to a request, transmitted to the remote server by the client device, that is based on the user interface input, and wherein determining the current client modality of the multimodal client device is by the multimodal client device and occurs after transmission of the request. In some versions of those implementations, the method further includes: while at least part of the client device output is being rendered by the one or more user interface output devices of the multimodal client device detecting a switch of the multimodal client device from the current client device modality to a discrete new client device modality, detecting a switch of the multimodal client device from the current client device modality to a discrete new client device modality. The method further includes, in response to detecting the switch, generating alternate client device output using the multimodal response, wherein the alternative client device output includes additional content, or less content, relative to the client device output. The method further includes causing the alternate client device output to be rendered by the multimodal response client device. In some of those versions, the method further includes the client device output including audible output rendered via at least one speaker of the one or more user interface output devices of the multimodal client device and visual output rendered via at least one display of the one or more user interface output devices, the alternate client device lacks the visual output, and causing the alternative client device output to be rendered by the multimodal client device comprises ceasing rendering of the visual output by the at least one display.

In some of those versions, the components of the multimodal response include a core message component and one or more modality dependent components. In some additional or alternative versions, generating the client device output further includes selecting at least the core message component of the multimodal response. The method further includes selecting the one or more components of the multimodal response which correlate with the current client device modality by selecting one or more of the modality dependent components. In some of those versions, the current client device modality is a voice only interaction and the client device output is rendered only via one or more speakers of the one or more user interface output devices.

In additional or alternative versions, the current client device modality is a voice only interaction and the client device output is rendered only via one or more speakers of the one or more user interface output devices. In additional or alternative versions, the current client device modality is a voice forward interaction, the core message component of the client device is rendered via only one or more speakers of the one or more user interface output device, and the one or more modality dependent components of the client device output are rendered via a touch screen of the one or more user interface output devices. In additional or alternative versions, the current client device is a multimodal interaction and the client device output is rendered via one or more speakers and via a touch screen of the one or more user interface output devices. In additional or alternative versions, the current device modality is a visual forward interaction, the core message component of the client device output is rendered via only a touch screen of the one or more user interface output devices, and the one or more modality dependent components of the client device output are rendered via one or more speakers of the one or more user interface output devices. In additional or alternative versions, the current device modality is a visual only interaction, and the client device output is rendered via only a touch screen of the one or more user interface output devices.

In some implementations, determining, based at least in part on the sensor data, the current client device modality includes determining an orientation of the multimodal client device, and selecting the current client device modality based on the orientation of the multimodal client device.

In various implementations, a method includes determining an error in generating output for a client device action where the client device action is determine from one or more instances of user interface input provided by a user of a multimodal client. The method further includes determining, based at least in part on sensor data from one or more sensors of the multimodal client device, a current client device modality of the multimodal client device, where the current device modality is one of a plurality of discrete client device modalities available for the multimodal client device, and where the sensor data based on which the current client device modality is determined is in addition to any sensor data generated by the one or more instances of user interface input. The method further includes generating an error message for the error in generating output for the client device action using a multimodal response, where the multimodal response includes components of output for the error for the plurality of discrete client device modalities, and where generating the error message includes selecting one or more of the components of the multimodal response which correlates with the current device modality. The method further includes causing the error message to be rendered by one or more user interface output devices of the multimodal client device.

In many implementations, a method includes receiving, via a network interface at one or more server devices remote from a multimodal client device, a client device action and a current client device modality. The method further includes determining the client device action based on one or more instances of user interface input provided by a user of the multimodal client device. The method further includes determining the current client device modality based at least in part on sensor data from one or more sensors of the multimodal client device. The method further includes the current client device modalities is one of a plurality of discrete client device modalities available for the multimodal client device. The method further includes the sensor data base don which on which the current client device modality is determined is in addition to any sensor data generated by the one or more instances of user interface input. The method further includes generating client device output for the client device action using a multimodal response, where the multimodal response includes components of output for the client device action for which the plurality of discrete client device modalities, and where generating the client device output includes selecting one or more of the components of the multimodal response which correlate with the current client device modality. The method further includes transmitting, for rendering by one or more user interface output devices of the multimodal client device, the client device output to the multimodal client device via the network interface.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
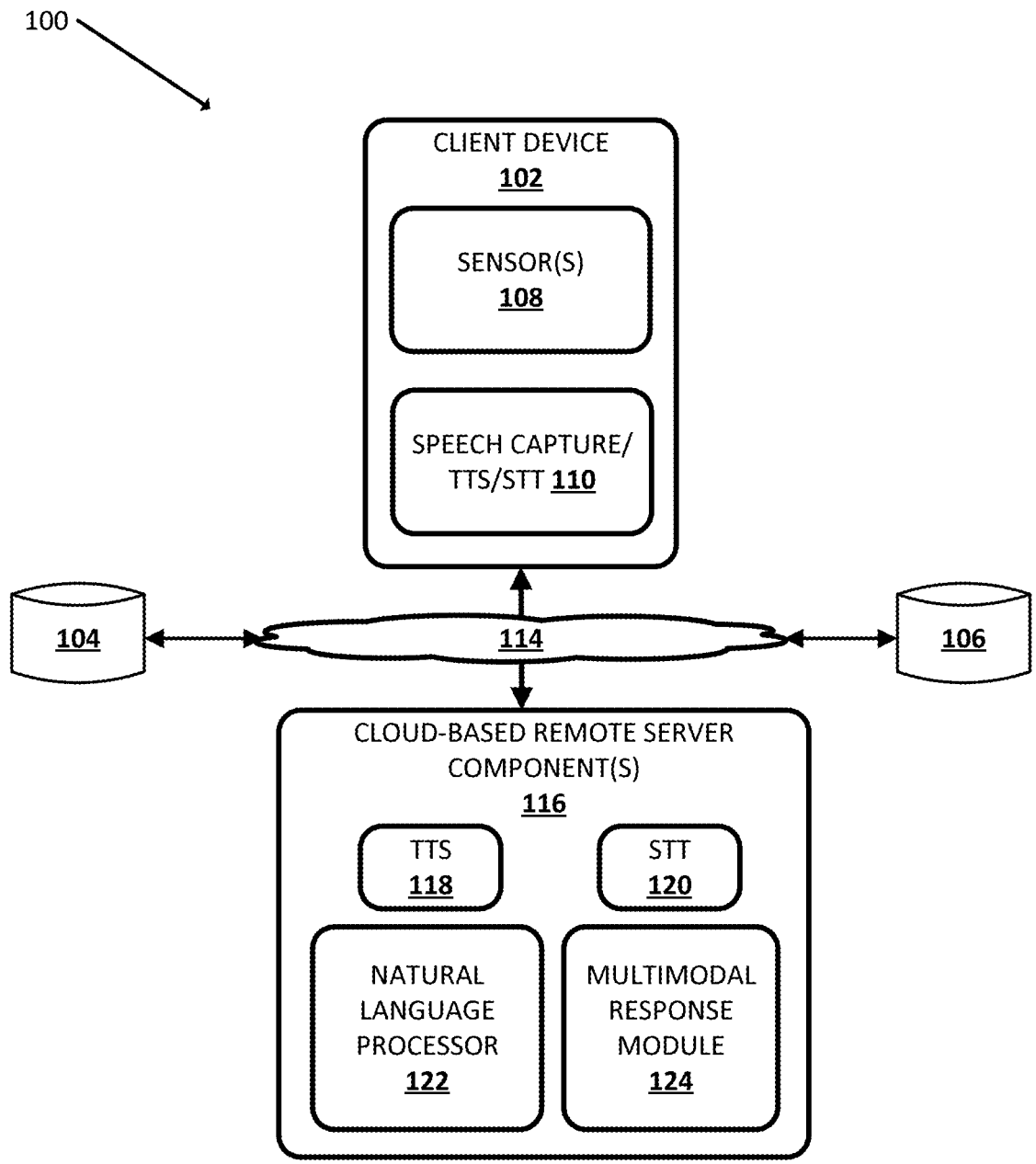
FIG. 1 is a block diagram illustrating an example environment in which various implementations disclosed herein can be implemented.

FIG. 1 illustrates an example environment 100 in which various implementations can be implemented. The example environment 100 includes client device 102. One or more cloud-based remote server components 116, such as natural language processor 122 and/or multimodal response module 124, may be implemented on one or more computing systems (collectively referred to as a "cloud" computing system) that are communicatively coupled to client device 102 via one or more local and/or wide area networks (e.g., the internet) indicated generally as 114.

Client device 102 may include, for example, one or more of: a desktop computing device, a laptop computing device, a tablet computing device, a touch sensitive computing device (e.g., a computing device which can receive input via touch from the user), a mobile phone computing device, a computing device in a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). In many implementations, client device 102 can be a multimodal client device. Additional and/or alternative client computing devices may be provided.

In various implementations, client device 102 may include one or more sensors 108 that may come in various forms. Sensors 108 can sense varying types of input to the client device 102 such as verbal, textual, graphical, physical (e.g., a touch on a display device including a touch sensitive projector and/or a touch sensitive screen of a computing device), and/or visual (e.g., a gesture) based input. Some client devices 102 may be equipped with one or more digital cameras that are configured to capture and provide signal(s) indicative of movement detected in their fields of view. Additionally or alternatively, some client devices may be equipped with sensors that detect acoustic (or pressure) waves, such as one or more microphones.

Sensors 108 can collect a variety of sensor data used in part to determine the current modality of client device 102 including: one or more cameras, an IMU, a gyroscope, a GPS, a microphone, one or more pressure sensors, one or more proximity sensors, etc. In some implementations, sensor data used in determining device modality can be collected using different sensors that receive user interface input. For example, a microphone can be used to collect user interface input and IMU data indicating the position and/or pose of a client device can be used in determining modality. In other implementations, a sensor can be used to collect user interface input data as well as determine device modality. For example, a microphone can determine user interface input, and the same microphone can determine ambient noise surrounding the client device. In other words, the same sensor (e.g., a microphone) can have a set of sensor data corresponding to user interface input and a second set of sensor data unrelated to user interface input for use in determining device modality.

Client device 102 and/or cloud-based remote server components 116 can be in communication with one or more devices 104. Devices 104 can include any of a variety of devices including: Internet of Things devices such as smart appliances, smart thermostats, smart coffee makers, smart lights, smart locks, smart lights, etc. The devices 104 are linked with the client device 102 (and/or a particular user of the client device 102) and with one another. For example, the devices 104 can be linked to a profile assigned to the client device 102 (and optionally other client devices) and/or can be linked to a profile assigned to a user of the client device 102. Collectively, the client device 102, other client device(s), and the devices 104 can define a coordinated ecosystem of devices. In various implementations, devices are linked to one another via a device topology representation that can be user created and/or automatically created, and that may define various client devices, various smart devices, identifier(s) for each, and/or attribute(s) for each. For example, the identifier(s) for a device can specify a room (and/or other area(s)) of a structure in which the device is located (e.g., living room, kitchen) and/or can specify nickname(s) and/or alias(es) for the device (e.g. couch lamp, front door lock, bedroom speaker, kitchen assistant, etc.). In this manner, the identifiers of devices can be names, aliases, and/or locations of the respective devices that the user is likely to associate with the respective devices.

Figure 3:
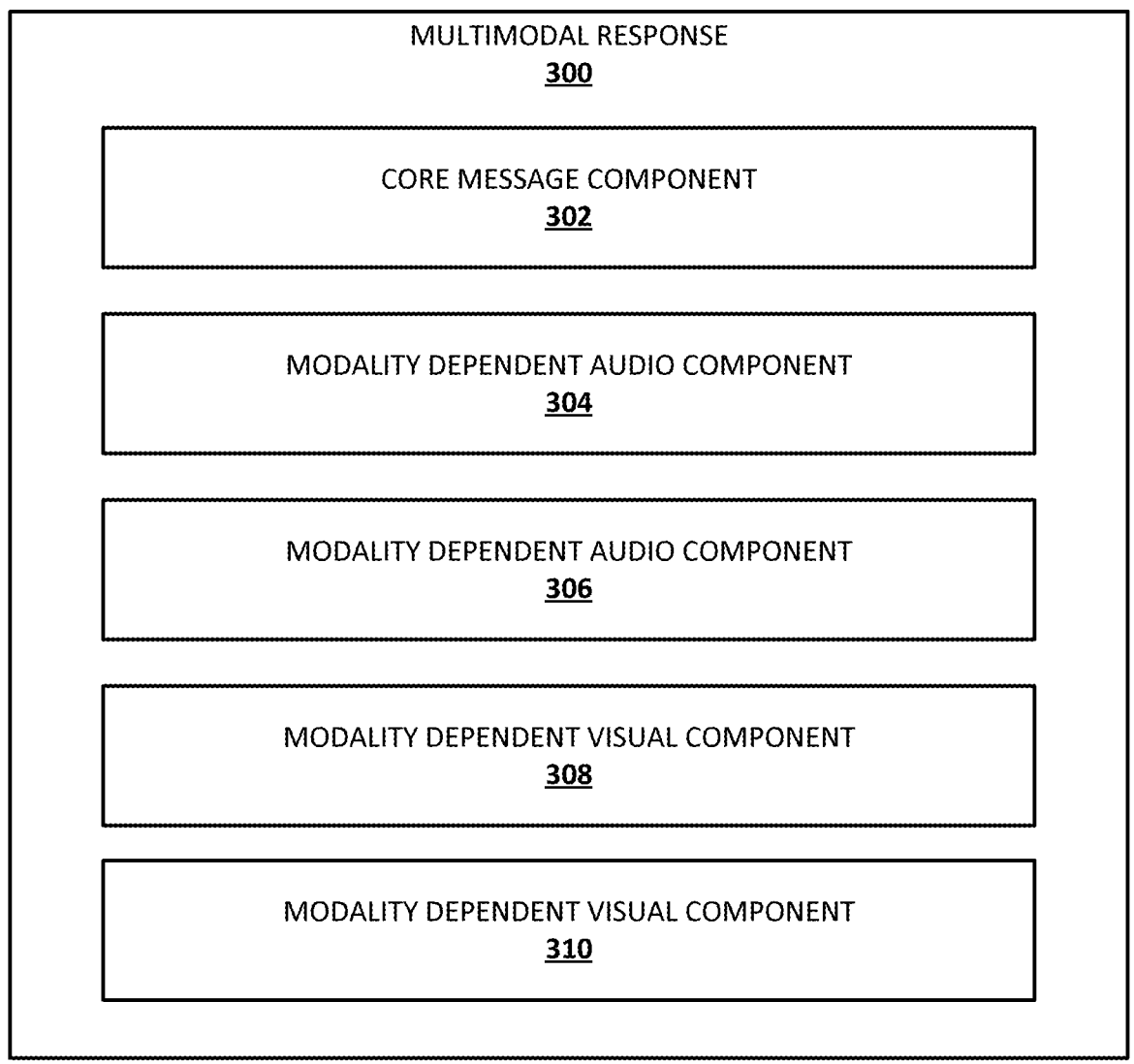
FIG. 3 illustrates an example multimodal response according to implementations disclosed herein.

In many implementations, devices 104 can be controlled by a client device 102 in a variety of modalities. For example, a smart thermostat can be controlled by voice interactions (e.g., a user giving a command to a standalone interactive speaker and/or multimodal device) as well as physical interactions (e.g., controlling a display on a smart thermostat itself and/or generating new command input on a multimodal device). A multimodal response can generate a variety of combinations of spoken and/or visual output after receiving user input to change temperature by selecting components of the multimodal response which correspond to the modality of the client device. A multimodal response in accordance with various implementations is illustrated in FIG. 3.

Devices 104 can be directly controlled by client device 102 and/or devices 104 can be controlled by one or more third party agents 106 hosted by remote device(s) (e.g., another cloud-based component). Furthermore, one or more third party agents 106 can also perform function(s) that are in addition to controlling devices 104 and/or controlling other hardware devices. For example, the client device 102 can interact with a third party agent 106 to cause a service to be performed, a transaction to be initiated, etc. In some implementations, third party agent 106 can provide one or more multimodal responses for generating client device output in response to receiving a command to initiate an action controlled by the third party agent. For example, a third party agent 106 can receive a user input command to turn on a smart light. The third party agent, in an addition to turning on the smart light, can transmit a multimodal response to the cloud-based remote server component(s) 116 and/or client device 102 such that additional output can be rendered on a client device depending on its modality to confirm the light has been turned on.

In many implementations, client device 102 may engage in dialog sessions with one or more users via user interface input devices and/or output devices of one or more client devices. In some implementations, client device 102 may engage in dialog sessions with a user in response to user interface input provided by the user via one or more user interface input devices of one of the client devices 102. In some of those implementations, the user interface input is explicitly directly to an automated assistant (not illustrated). For example, a user may speak a predetermined invocation phrase, such as "OK, Assistant," or "Hey, Assistant," to cause an automated assistant to begin actively listening.

In some implementations, client device 102 may engage in a dialog session in response to user interface input, even when that user interface input is not explicitly directly to an automated assistant. In many implementations, client device 102 may utilize speech recognition to convert utterances from users into text, and respond to the text accordingly, e.g., by providing visual information, by providing search results, by providing general information, and/or taking one or more response actions (e.g., playing media, launching a game, ordering food, etc.). In some implementations, the client device 102 can additionally or alternatively respond to utterances without converting the utterances into text. For example, the client device 102 can convert voice input into an embedding, into entity representation(s) (that indicate entity/entities present in the voice input), and/or other "non-textual" representations and operate on such non-textual representations. Accordingly, implementations described herein as operating based on text converted from voice input may additionally and/or alternatively operate on the voice input directly and/or other non-textual representations of the voice input.

Client devices 102 and cloud-based remote server components 116 may include one or more memories for storage of data and software applications, one or more processors for accessing data and executing applications, and other components that facilitate communication over a network. The operations performed by one or more computing devices 102 may be distributed across multiple computer systems.

In various implementations, client device 102 may include a corresponding speech capture/text-to-speech ("TTS")/speech-to-text ("STT") module 110. In other implementations, one or more aspects of speech capture/TTS/STT module 110 may be implemented separately from the client device 102. Speech capture/TTS/STT module 110 may be configured to perform one or more functions: capture a user's speech, e.g., via a microphone; convert that captured audio to text (and/or to other representations or embeddings); and/or convert text to speech. For example, in some implementations, because a client device 102 may be relatively constrained in terms of computing resources (e.g., processor cycles, memory, battery, etc.), the speech capture/TTS/STT module 110 that is local to the client device 102 may be configured to convert a finite number of different spoken phrases—particularly phrases that invoke an automated assistant—to text (or other forms, such as lower dimensionality embeddings). Other speech input may be sent to cloud-based remote server components 116, which may include cloud-based TTS module 118 and/or cloud-based STT module 120.

Cloud-based STT module 120 may be configured to leverage the virtually limitless resources of the cloud to convert audio data captured by speech capture/TTS/STT module 110 into text (which may then be provided to natural language processor 122). Similarly, cloud-based TTS module 118 may be configured to leverage the virtually limitless resources of the cloud to convert textual data into computer-generated speech output. In some implementations, TTS module 118 may provide the computer-generated speech output to client device 102 to be output directly, e.g., using one or more speakers. In other implementations, textual data (e.g., natural language responses) generated by STT module 120 may be provided to speech capture/TTS/STT module 110, which may then convert the textual data into computer-generated speech that is output locally.

Cloud-based remote server components 116 may include a natural language processor 122, a multimodal response module 124, the aforementioned TTS module 118, the aforementioned STT module 120, and other components, some of which are described in more detail below. In some implementations, one or more of the engines and/or modules of client device 102 and/or cloud-based remote server components 116 may be omitted, combined, and/or implemented in a component that is separate from client device 102. In some implementations, to protect privacy, one or more of the components such as natural language processor 122, speech capture/TTS/STT module 110, multimodal response module 124, etc., may be implemented at least in part on client device 102 (e.g., to the exclusion of the cloud).

In some implementations, client device 102 generates responsive content in response to various inputs generated by a user during a human-to-computer dialog session. Additionally or alternatively, client device 102 may provide the responsive content for presentation to the user as part of the dialog session. For example, responsive content can be generated in response to free-form natural language input provided via client device 102. As used herein, free-form input is input that is formulated by the user that is not constrained to a group of options presented for selection by the user.

Natural language processor 122 processes natural language input generated by users via client device 102 and may generate annotated output. For example, the natural language processor 122 may process natural language free-form input that is generated by a user via one or more user interface input devices of client device 102. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. Also, for example, in some implementations the natural language processor 122 may additionally and/or alternatively include a dependency parser (not depicted) configured to determine syntactic relationships between terms in natural language input.

In some implementations, the natural language processor 122 may additionally and/or alternatively include an entity tagger (not depicted) configured to annotate entity references in one or more segments such as references to people (including, for instances, literary characters, celebrities, public figures, etc.), organizations, locations (real and imaginary), and so forth. The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster", references to the same entity based on one or more contextual cues. For example, the coreference resolver may be utilized to resolve the term "there" to "Hypothetical Café" in the natural language input "I liked Hypothetical Café last time we ate there."

In many implementations, one or more components of the natural language processor 122 may rely on annotations from one or more other components of the natural language processor 122. For example, in some implementations, the named entity tagger may rely on annotations from the coreference resolver and/or dependency parsers in annotating all mentions to a particular entity. Also, for example, in some implementations the coreference resolver may rely on annotations from the dependency parser in clustering references to the same entity. In many implementations, in processing a particular natural language input, one or more components of the natural language processor 122 may use related prior input and/or other related data outside of the particular natural language input to determine one or more annotations.

Multimodal response module 124 can retrieve a multimodal response related to user input, receive a multimodal response from a third party agent, determine the modality of client device 102, select one or more portions of the multimodal response to include in client device output, etc.

In many implementations, upon receiving user interface input from the client device, multimodal response module 124 can retrieve one or more multimodal responses which correlate with the user interface input. For example, a user can ask a client device "what is the current weather", and multimodal response module 124 can retrieve the corresponding multimodal response to render current weather output on the client device. Additionally or alternatively, a multimodal response can be retrieved from and/or transmitted to a cloud-based remote server component and/or the client device itself in response to user interface input received at the client device.

Multimodal response module 124 can additionally determine the current modality of a client device. A variety of data collected by client device 102 and/or sensor(s) 108 can indicate client device modality including the type of client device, the status of visual and/or audio components of a client device, the location of the client device, the pose of the client device, the position of a user with respect to the client device, etc.

In many implementations, multimodal response module 124 can determine the type of client device such as a standalone interactive speaker, a cellular telephone, a touch screen interface on a hardware device such as a smart thermostat, etc. For example, a smart thermostat can be controlled by a variety of client devices including the standalone interactive speaker, the cellular telephone, and/or the display screen on the smart thermostat itself. Some client devices are inherently limited to a specific modality by one or more hardware components not included in the client device (e.g., a device without a speaker can be limited to visual only interactions and similarly a device without a display screen can be limited to voice only interactions). While the standalone interactive speaker, the cellular telephone, and/or the display screen on the smart thermostat can all utilize the same multimodal response in controlling the thermostat, the standalone interactive speaker, by lacking a visual display, is typically limited to voice only interactions. Similarly, a display screen on the smart thermostat which lacks a microphone and/or speaker, is typically limited to visual only interactions. A cellular telephone (as well as other multimodal client devices) can engage additional modalities and therefore can utilize additional components of the multimodal response. In other words, a multimodal client device engaging in a voice only interaction can use similar (and often the same) components of a multimodal response as a client device which can only engage in voice only interactions such as a standalone interactive speaker. Similarity, a multimodal client device engaging in a visual only interaction can use similar (or the same) components of a multimodal response as a visual only client device.

In many implementations, the location of a client device can be used in determining one or more components of a multimodal response to render. For example, a GPS unit can determine the position of a mobile device. Positions known to the client device can indicate the types of interactions a user might want to engage in. For example, a user may not want to render sounds when they are at known "work" location and the multimodal response module 124 can determine a visual only interaction and/or a visual forward interaction. Similarly, a user may be less concerned with rendering sound at home, and a known "home" location can indicate to the multimodal response module 124 to determine a multimodal interaction. In some implementations, a client device can determine its location by connecting to a known Wi-Fi network (e.g., the client device knows when it is connected to the "home" Wi-Fi network).

Many client devices can be placed in a variety of poses by a user. For example, a cellular telephone can be placed in a "face down" position which will block a user's ability to see the phone screen. In some such implementations, a pose which inhibits a user's ability to see a display can indicate to multimodal response module 124 the client device is in a voice only or voice forward interaction. A variety of sensors can be used to determine the pose of a client device including an IMU, one or more cameras, etc.

Additionally or alternatively, the position of a user with respect to a client device can be utilized to determine device modality. For example, one or more cameras can determine a user's position with respect to the client device. Similarly, a proximity sensor can determine when a user is within a threshold range of a client device. In many implementations, a multimodal client device can be in different modalities depending on the location a user is from its screen. For example, a user holding a client device is typically very close to the screen and can see more detailed modality dependent visual components of the multimodal response. In other embodiments, a client device can determine a user is on the other side of a room from the client device. While the user on the other side of the room can still see some information on the client device display, multimodal response module 124 can determine the client device is engaging in a voice forward interaction and render modality dependent visual components with less dense visual information on the display.

A variety of other client device specific sensor data can be utilized by multimodal response module 124 in determining device modality. For example, an in-vehicle navigation system can utilize a variety of sensors to determine when the vehicle is in motion. In some such implementations, the multimodal response module 124 can determine the in-vehicle navigation system can engage in voice only or voice forward interactions while the vehicle is in motion, and can engage in any of the discrete interaction types within the multimodal spectrum while the vehicle is stopped.

Upon determining the current modality of client device 102, multimodal response module 124 can select one or more components of the multimodal response to render output for the user via the client device. Components of a multimodal response including a core message component and one or more modality dependent components are illustrated in FIG. 3.

Figure 2:
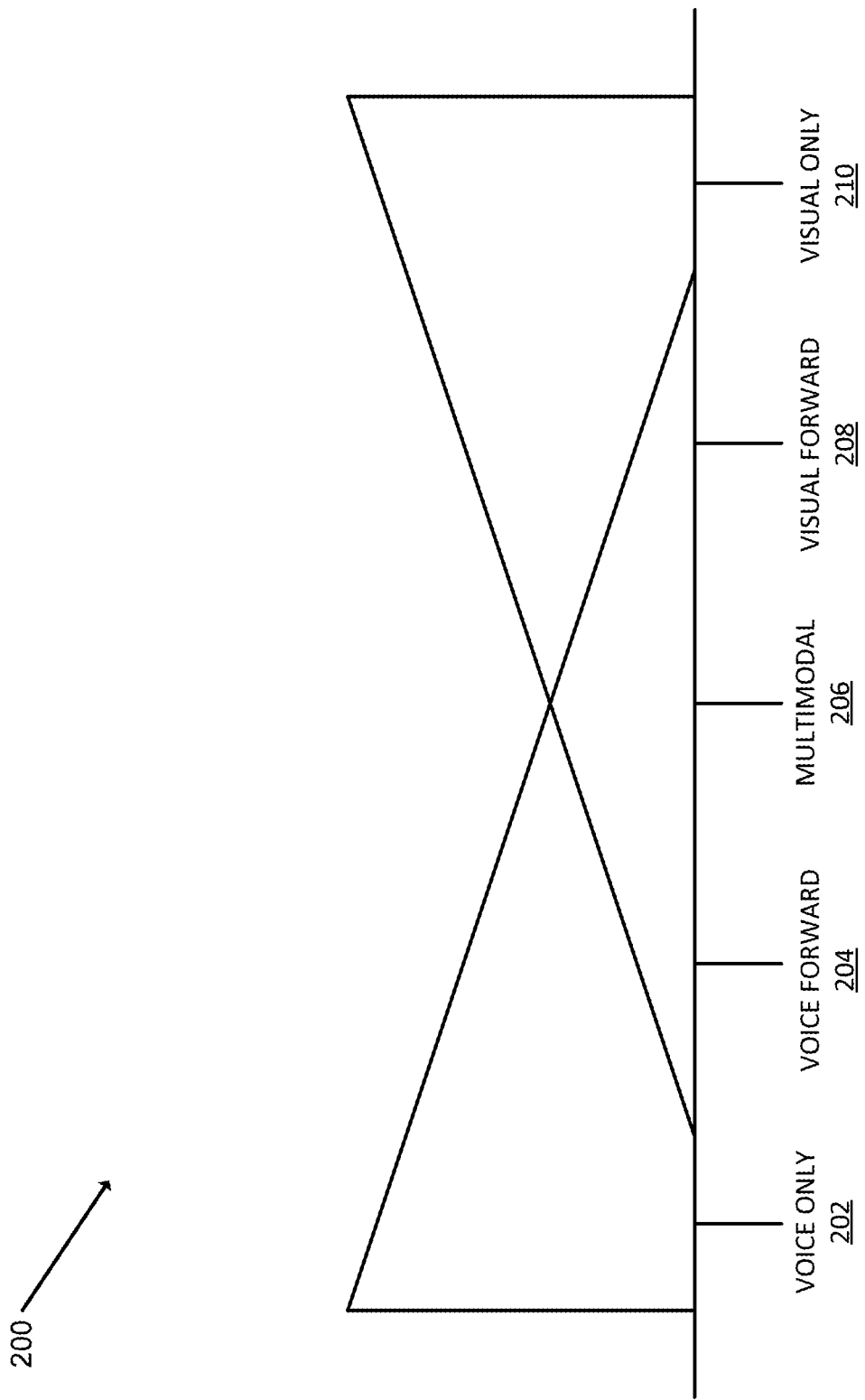
FIG. 2 illustrates an example multimodal spectrum according to implementations disclosed herein.

FIG. 2 illustrates an image of a multimodal spectrum 200 in accordance with various implementations described herein. A multimodal spectrum includes a plurality of discrete modalities for multimodal client device interactions. In many implementations, a multimodal spectrum 200 can include voice only interactions 202, voice forward interactions 204, multimodal interactions 206 (also referred to as "intermodal interactions"), visual forward interactions 208, visual only interactions 210, etc.

Voice only interactions 202 can include a user speaking to and/or listening to a client device (i.e., audio interactions). For example, a standalone interactive speaker can engage in voice only interactions. Additionally or alternatively, a multimodal client device can engage in voice only interactions when, for example, a screen is not visible to a user. As an illustrative example, a cellular telephone can engage in voice only interactions when it is placed screen side down on a surface, a screen is turned off, a user is too far away to see a screen, etc. In many implementations, voice only interactions 202 include a user providing spoken input to a client device via a microphone coupled with a client device rendering output through a speaker. An example of a voice only interaction in accordance with many implementations is described in FIG. 4.

Additionally or alternatively, visual only interactions 210 include a user providing a client device with physical input (e.g., typing, clicking physical buttons, clicking buttons rendered by a user interface display, shaking a client device, etc.) coupled with output rendered by a client device on a display. Some client devices engaging in visual only interactions can lack a microphone and/or a speaker. In other implementations, a multimodal client device can engage in visual only interactions when audio interfaces are disabled. For example, a smart phone can engage in visual only interactions if the client device speaker is muted. An example of a visual only interaction is described in FIGS. 6A-6B.

Multimodal client devices engaging in voice forward interactions 204, multimodal interactions 206, and visual forward interactions 208 can use a variety of input interfaces and/or output interfaces such as a microphone and speaker for voice interactions as well as a physical input and a display screen for visual interactions. In some implementations voice forward interactions 204 can include rendering a core message component of a multimodal response as audio as well as rendering one or more additional modality dependent audio and/or visual components of the multimodal response. For example, a multimodal client device can render output telling a user the current weather (i.e., a core message component of a multimodal response) and direct the user to look at the screen for a weekly weather report via a speaker (i.e. a modality dependent audio component of the multimodal response), and render a weekly weather report on the client device display (i.e., a modality dependent visual component of the multimodal response).

Additionally or alternatively, in a multimodal interaction 206, a client device can render the current weather as audio output as well as the current weather as visual output (i.e., the core message component can be rendered via a speaker and a screen), and one or more of a variety of additional weather information can be visually rendered on the screen such as an interactive weather report for the next week where a user can select an individual day for more detailed weather information for that day (i.e., a modality dependent visual component). In some such implementations, one or more additional audio components can be rendered after a user selects an individual day for more detailed weather information (i.e. a modality dependent audio component).

Similarly, a visual forward interaction 208 can, for example, be generated when one or more sensors determines a screen is visible to a user, but the user is at a threshold distance away from the screen and typically is unable to read detailed information on the screen. In some such implementations, the current temperature (i.e., the core message component) can be rendered via a speaker and the current temperature can be rendered as a large graphic such that the user can see the current temperature from across the room (i.e., a modality dependent visual component).

FIG. 3 illustrates an example multimodal response in accordance with various implementations described herein. In many implementations, multimodal response 300 can include core message component 302, modality dependent audio components 304, 306, as well as modality dependent visual components 308, 310. Core message component 302 can include information the multimodal response will generate for all modalities. In some implementations, a client device can determine how to render core message component 302 at the client device. In other words, the core message component can be translated into either audio output or visual output by the client device (e.g., text can be visually rendered and converted to spoken output by the client device). In some other implementations, the core message component 302 can further include an audio core message component (not illustrated) as well as a visual core message component (not illustrated) which can enable a client device to render the same information for any modality. Additionally or alternatively, particular actions performed by a multimodal client device cannot be performed in every device modality and a core message component 302 can include either a visual component or an audio component. For example, a video cannot be played in an audio only interaction, therefore a core message component comprising a video will not be rendered via an audio only interaction. In some such implementations, a multimodal response can generate an error message to render for the user indicating the video cannot be played.

In a variety of implementations, a multimodal response can be structured such that it has a preferred device modality. For example, a client device can switch to a voice forward interaction to render the information in a multimodal response whenever possible. In other words, the multimodal response can push a client device into a specific modality when several modalities are available to the client device.

Modality dependent audio components 304, 306 can include different audio information which can be rendered by the client device. Similarly, modality dependent visual components 308, 310 can include different visual information which can be rendered by the client device. In many implementations, a multimodal response module 124 (as illustrated in FIG. 1) can select a combination of modality dependent components (such as 304, 306, 308, 310) for a specific client device in a specific modality. In other words, one or more modality dependent components selected for a first client device in a modality can be different than one or more modality dependent components selected for a second client device in the same modality. Furthermore, different components of the multimodal response can be selected for the same client device in the same modality at different times. For example, a modality dependent visual component can change depending on a detected distance of the user from the client device.

In many implementations, multimodal responses can be individually generated for individual client actions. For example, a user can provide an output to render for several modalities which can be merged into a multimodal response by one or more server devices.

Figure 4:
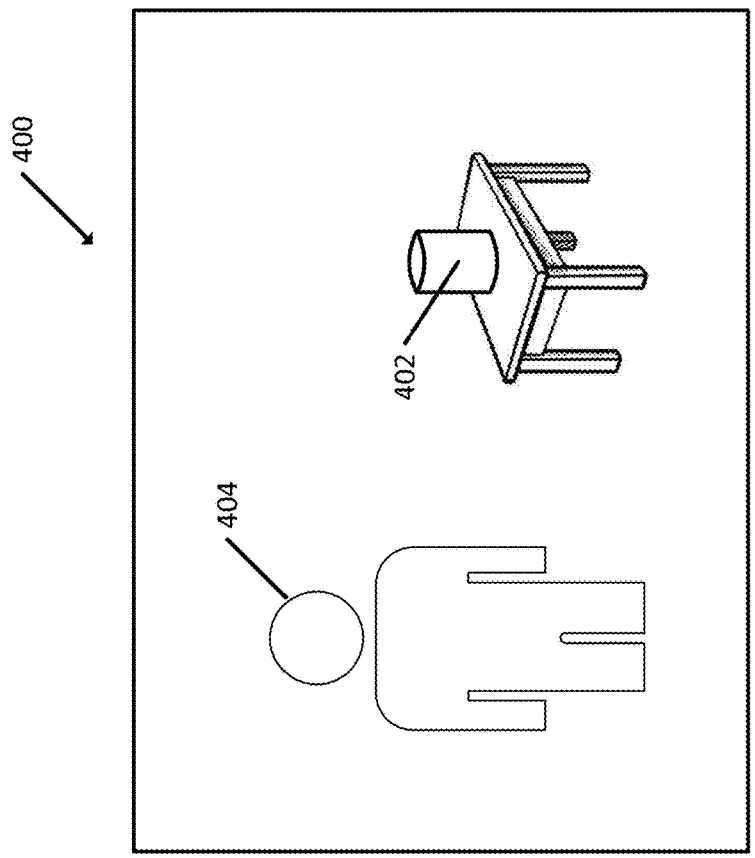
FIG. 4 illustrates an example of a user interacting with a client device according to implementations disclosed herein.

FIG. 4 illustrates an example image of a user engaging with a client device in a voice only interaction. Image 400 includes a client device 402 and a user 404. In many implementations, client device 402 can include a standalone interactive speaker. Additionally or alternatively, a multimodal client device can engage in voice only interactions based on the unavailability of physical input and/or visual output. For example, user 404 can change the temperature of a networked smart thermostat (not illustrated) by saying "Assistant, please turn up the temperature by three degrees." A core message component for a multimodal response can indicate the change in temperature. For example, in a voice only interaction, a speaker can render "OK, the temperature has been set to 75 degrees". In many implementations, one or more additional modality dependent audio components of the multimodal response can additionally be rendered such as "The current temperature is 73 degrees", "It will take approximately one hour to reach 75 degrees", etc.

Figure 5:
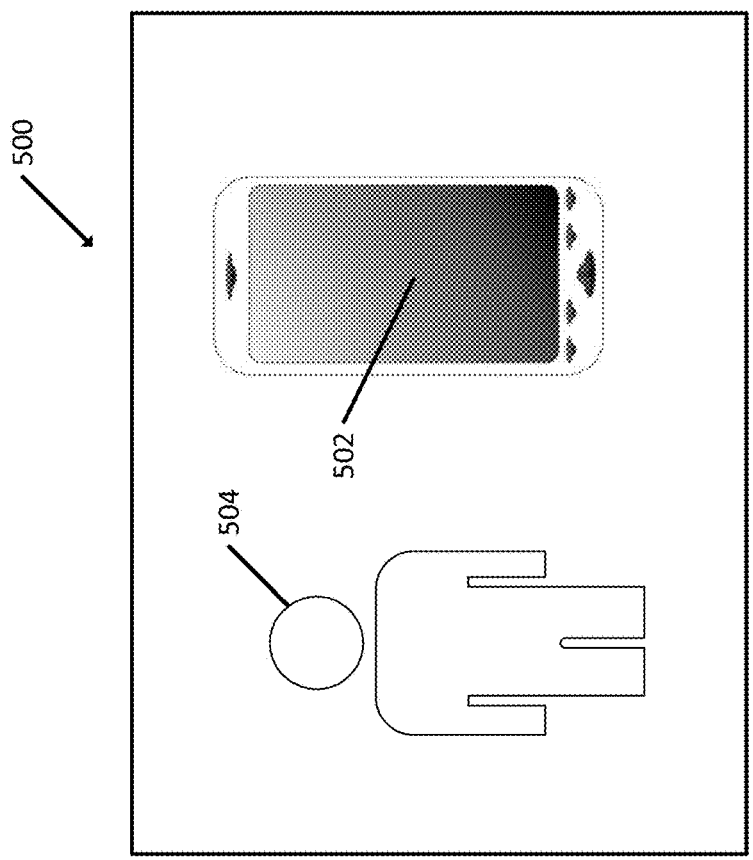
FIG. 5 illustrates another example of a user interacting with a client device according to implementations disclosed herein.

FIG. 5 illustrates an example image of a user engaging with a multimodal client device. Image 500 includes multimodal client device 502 (such as a cellular telephone) and user 504. In many implementations, a multimodal client device can engage in any discrete modality in a multimodal spectrum. A visual forward interaction, a multimodal interaction, and/or a voice forward interaction can share one or more visual and/or voice components of a multimodal response. For example, a user input generated by user 504 can change the temperature setting on a networked smart thermostat. A core message component can be audibly rendered as well as shown on a display screen. For example, a speaker can render "OK, the temperature has been set to 75 degrees" while a display screen renders a text message indicating the new temperature. One or more modality dependent voice components and/or one or more modality dependent visual components of the multimodal response can be rendered by the client device to enhance the core message component.

Figure 6B:
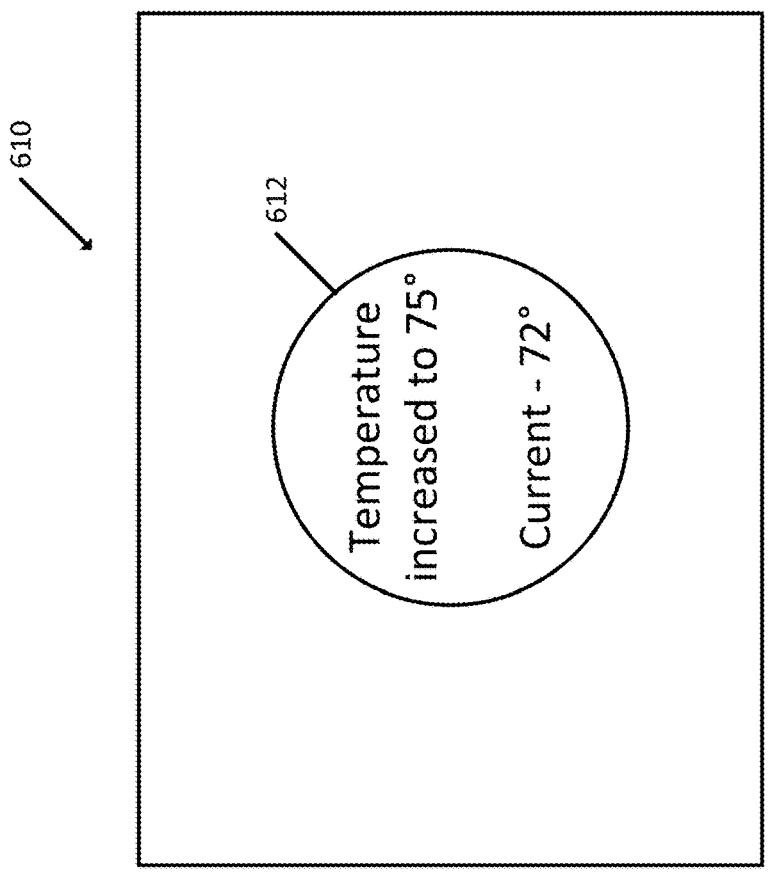
FIG. 6A and FIG. 6B illustrate another example of a user interacting with a client device according to implementations disclosed herein.
Figure 6A:
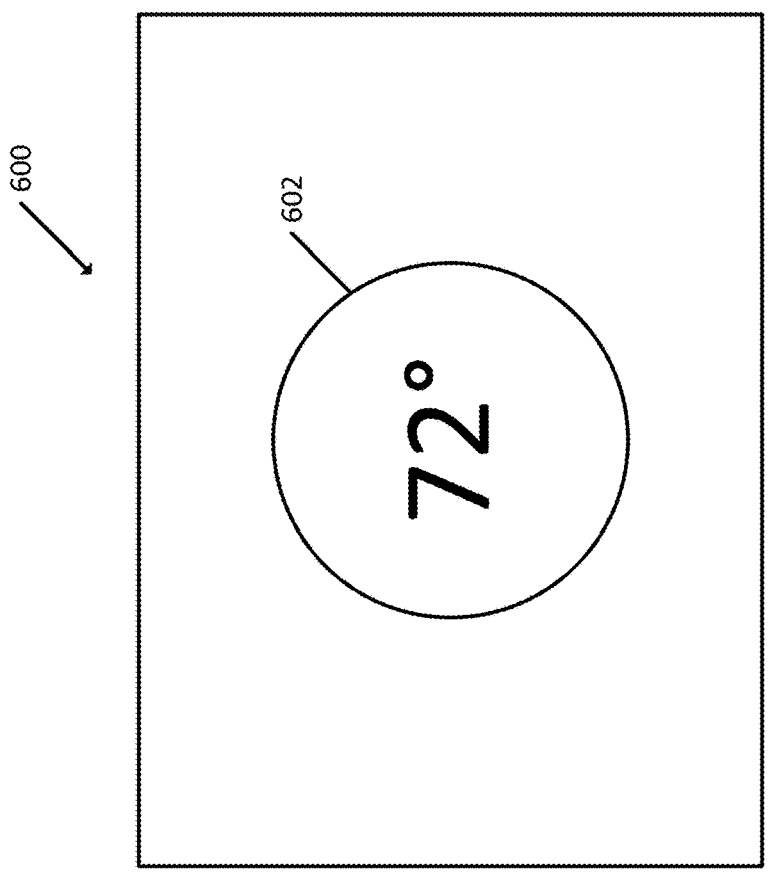

FIG. 6A illustrates an image of a client device before engaging in visual only interaction. Image 600 includes the display of a smart thermostat 602 which indicates the current temperature is 72 degrees. A user can change the temperature by interacting with a touch surface of the smart thermostat display to increase the temperature by three degrees. Image 610 of FIG. 6B illustrates the same smart thermostat display 612 after the temperature has been increased by three degrees. For example, a core message "Temperature increased to 75 degrees" can be rendered on the display. One or more modality dependent visual components of the multimodal response can also be rendered on the display such as the current temperature (e.g., "Current—72 degrees"). In many implementations, a multimodal client device (not illustrated) engaging in visual only interactions can control the smart thermostat. In some such implementations, after receiving user input to increase the temperature, the same core message component of the multimodal response that can be displayed on the smart thermostat display (e.g., "Temperature increased to 75 degrees") as well as the same modality dependent visual component (e.g., "Current—72 degrees"). In many implementations, a multimodal client device such as a cellular telephone (which typically has a larger screen for rendering content compared with a hardware device display) can render additional modality dependent visual components such as "it will take approximately one hour to reach 75 degrees". In other words, the specific client device can influence which components of the multimodal response are rendered for the same action being performed in the same modality.

Figure 7:
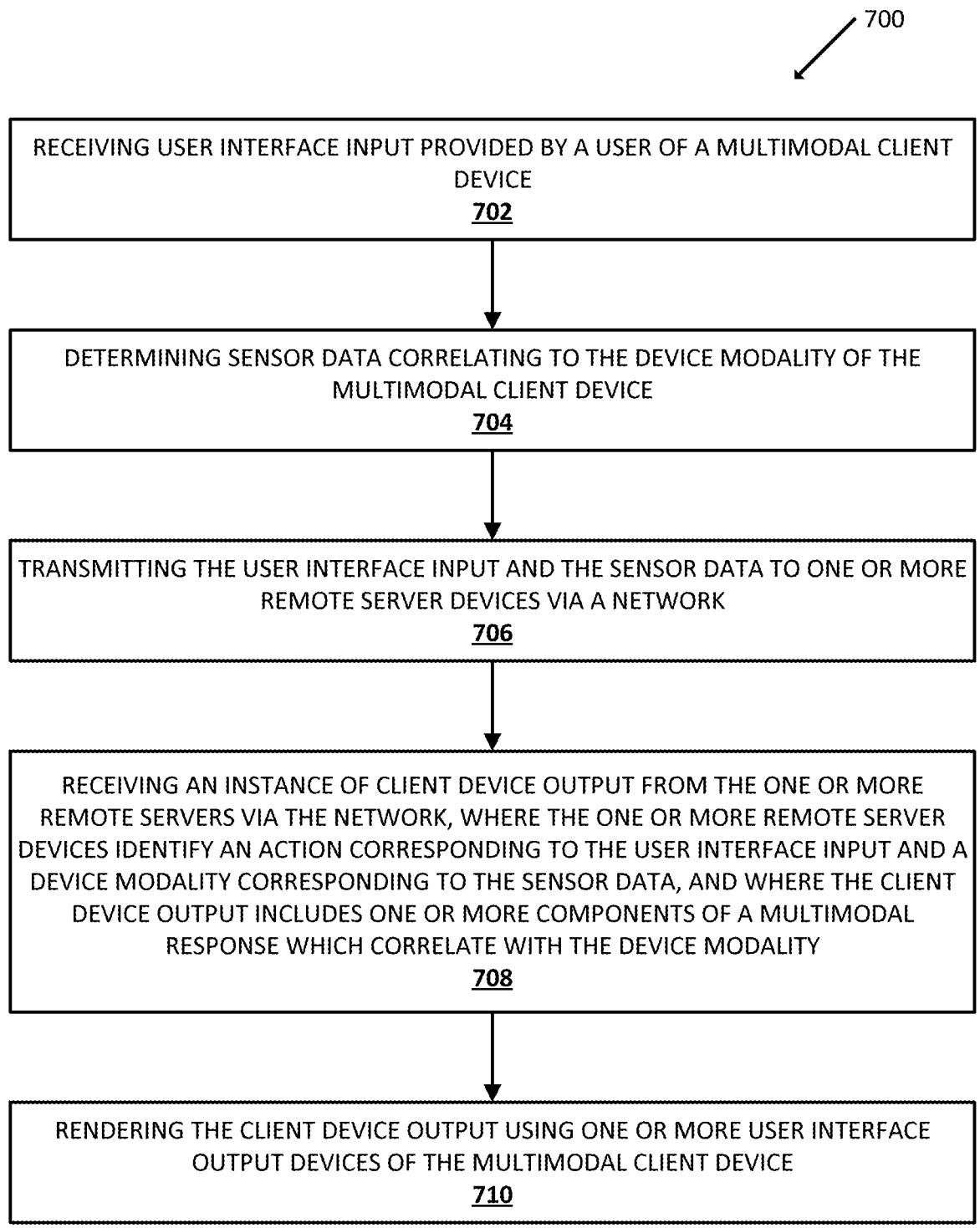
FIG. 7 is a flowchart illustrating a process in which various implementations disclosed herein can be implemented.

FIG. 7 is a flowchart illustrating an example process 700 of generating client device output using a multimodal response according to various implementations disclosed herein. For convenience, the operations of FIG. 7 are described with reference to a system that performs the operations. This system may include various components of various computer systems, such as one or more components of client device 102. Moreover, while the operations of process 700 are shown in a particular order, this is not meant to be limiting. One or more operations may be reordered, omitted, or added.

At block 702, the system receives user interface input provided by a user of a multimodal client device. For example, the system can receive spoken user interface input, typed user interface input, gesture-based input, and/or other input.

At block 704, the system determines sensor data correlating to the device modality of the multimodal client device.

At block 706, the system transmits the user interface input and the sensor data to one or more remote server devices via a network.

At block 708, the system receives an instance of client device output from the one or more remote server devices via the network. In many implementations, the one or more remote server devices identify an action corresponding to the user interface input as well as a device modality corresponding to the sensor data. Additionally or alternatively, the client device output can include one or more components of a multimodal response which correlates with the device modality. In many implementations, multimodal response module 124 can determine current device modality as well as select one or more components of a multimodal response to generate client device output.

At block 710, the system renders the client device output using one or more user interface output devices of the multimodal client device. For example, the system can render the client device output using user interface output devices that correspond to the client device output and, as a result, that also correspond to the current modality of the client device.

Figure 8:
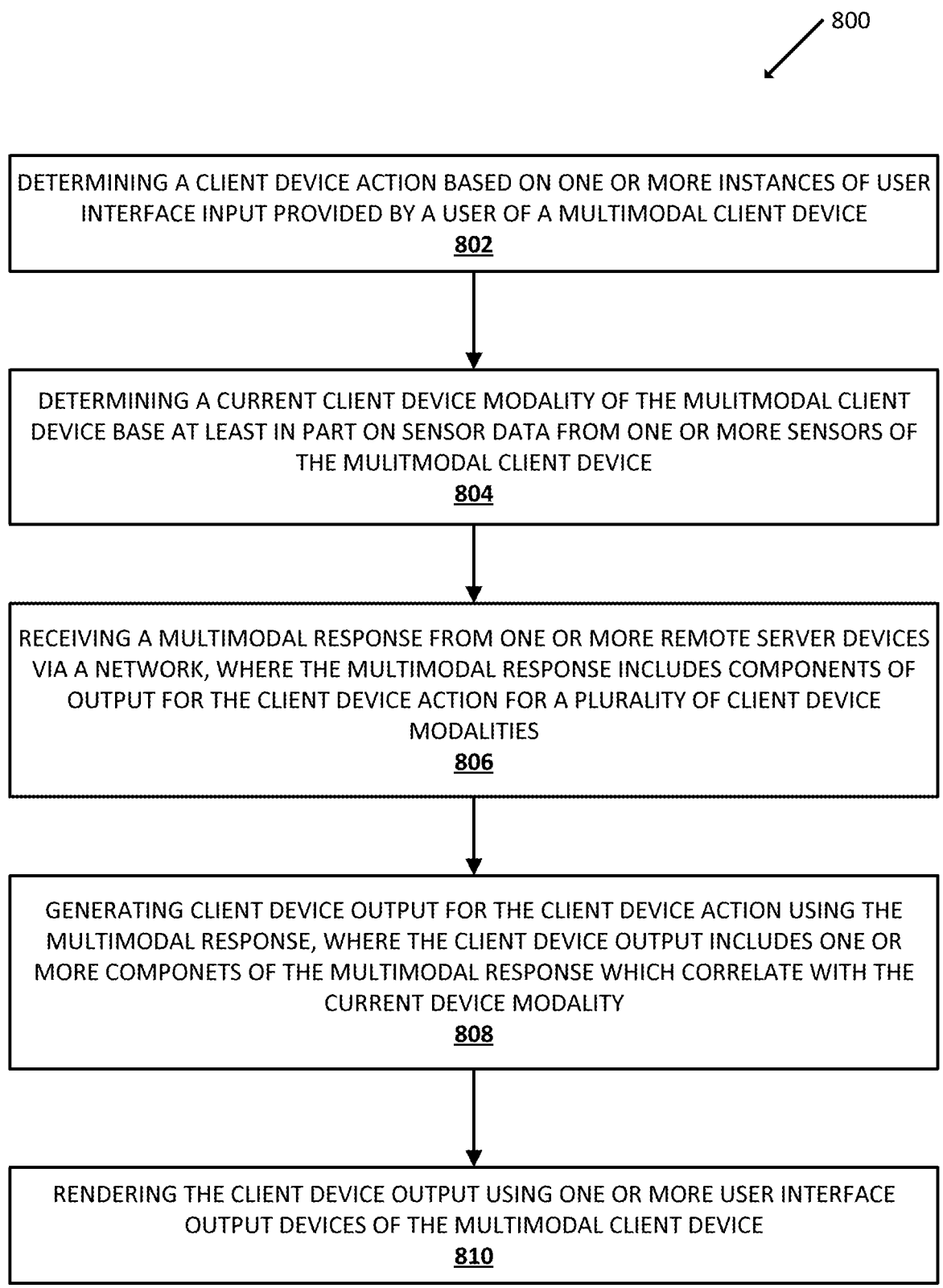
FIG. 8 is a flowchart illustrating another process in which various implementations disclosed herein can be implemented.

FIG. 8 is a flowchart illustrating an example process 800 of generating client device output using a multimodal response according to various implementations disclosed herein. For convenience, the operations of FIG. 8 are described with reference to a system that performs the operations. This system may include various components of various computer systems, such as one or more components of client device 102. Moreover, while the operations of process 800 are shown in a particular order, this is not meant to be limiting. One or more operations may be reordered, omitted, or added.

At block 802, the system determines a client device action based on one or more instances of user interface input provided by a user of a multimodal client device. In many implementations, a client device action can be determined from the user interface input. For example, the client device itself can determine the client device action from the received user interface input (optionally interfacing with remote server(s) in making the determination) and/or the client device action can be determined by remote system(s) based on transmission of the user interface input (and/or conversions thereof) to the remote system(s).

At block 804, the system determines a current client device modality of the multimodal client device based at last in part on sensor data from one or more sensors of the multimodal client device. In many implementations, device modality can be determined by multimodal response module 124 as described in FIG. 1.

At block 806, the system receives a multimodal response from one or more remote server devices via a network, where the multimodal response includes components of output for the client device action for a plurality of client device modalities.

At block 808, the system generates client device output for the client device action using the multimodal response. The client device output can include one or more components of the multimodal response which correlate with the current device modality. In many implementations, multimodal response module 124 can select one or more portions of the multimodal response to generate the client device output.

At block 810, the system renders the client device output using one or more user interface output devices of the multimodal client device.

Figure 9:
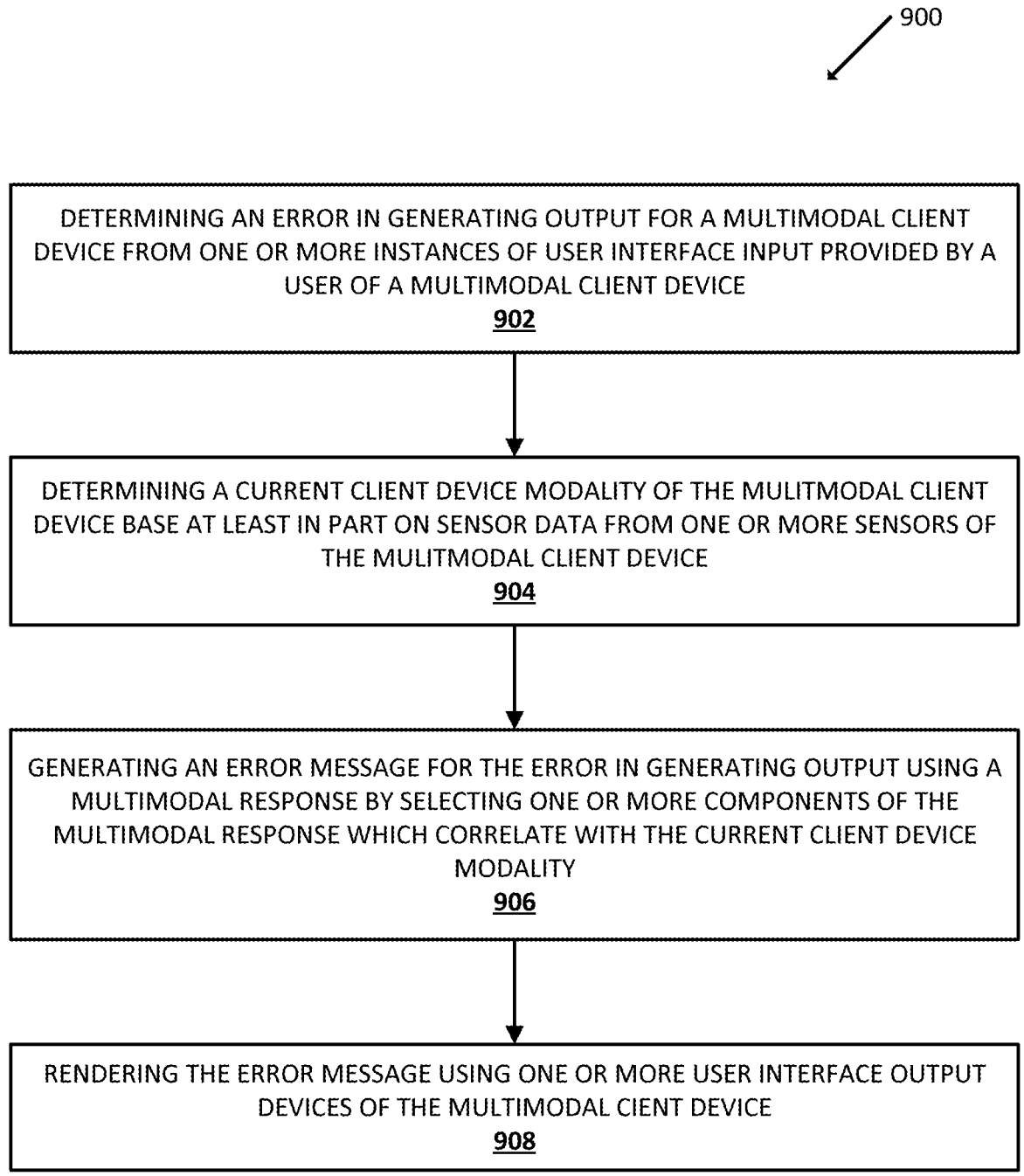
FIG. 9 is a flowchart illustrating another process in which various implementations disclosed herein can be implemented.

FIG. 9 is a flowchart illustrating an example process 900 of generating an error message for a client device using a multimodal response according to various implementations disclosed herein. For convenience, the operations of FIG. 9 are described with reference to a system that performs the operations. This system may include various components of various computer systems, such as one or more components of client device 102. Moreover, while the operations of process 900 are shown in a particular order, this is not meant to be limiting. One or more operations may be reordered, omitted, or added.

At block 902, the system determines an error in generating output for a multimodal client device from one or more instances of user interface input provided by a user of a multimodal client device.

At block 904, the system determines a current client device modality of the multimodal client device based at least in part on sensor data from one or more sensors of the multimodal client device.

At block 906, the system generates an error message for the error in generating output using a multimodal response by selecting one or more components of the multimodal response which correlate with the current client device modality.

At block 908, the system renders the error message using one or more user interface output devices of the multimodal client device. For example, an error message can be rendered via a client device speaker and/or as textual output on a client device display screen.

Figure 10:
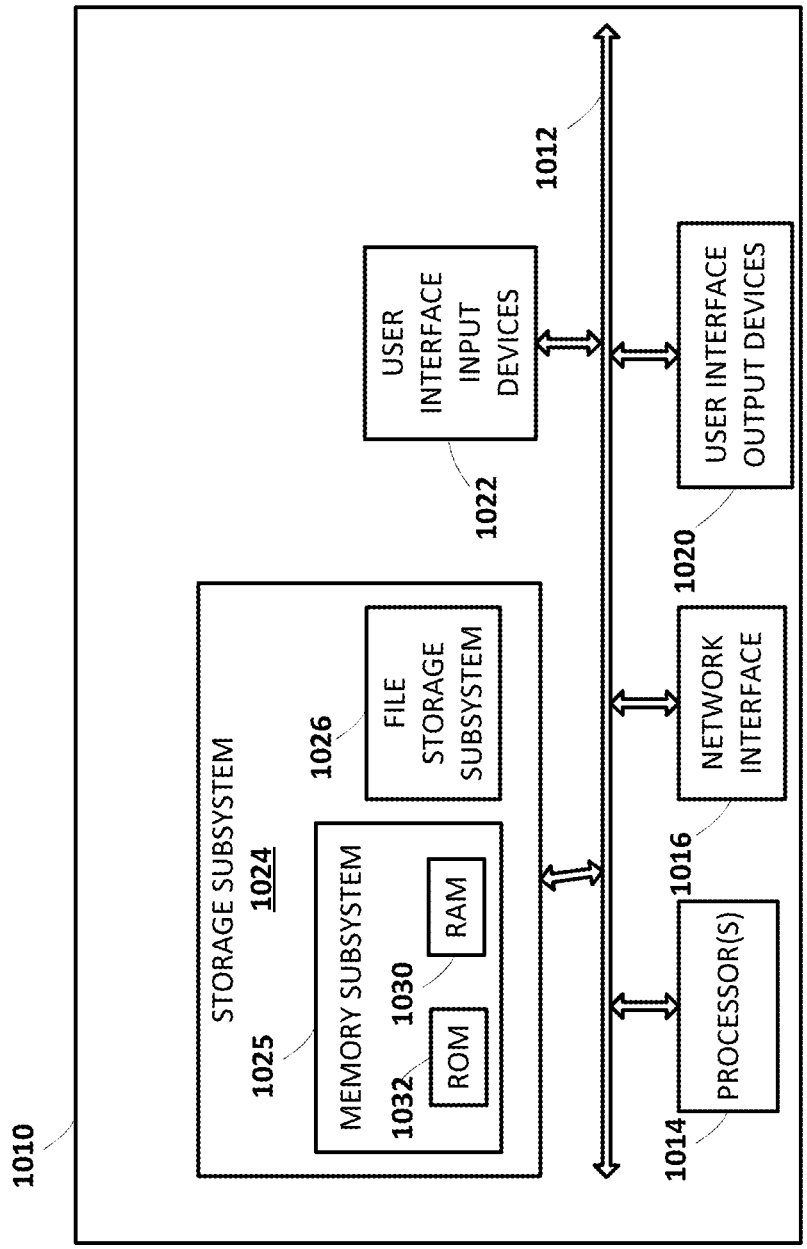
FIG. 10 is a block diagram illustrating an example architecture of a computing device.

FIG. 10 is a block diagram of an example computing device 1010 that may optionally be utilized to perform one or more aspects of techniques described herein. In some implementations, one or more of a client computing device, user-controlled resources module, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the processes of FIG. 7, FIG. 8, and/or FIG. 9, as well as to implement various components depicted in FIG. 1.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method implemented by one or more processors, the method comprising:
   determining a client device action based on one or more instances of user interface input provided by a user of a multimodal client device;
   processing, using a machine learning model, (1) sensor data from one or more sensors of the multimodal client device and (2) a multimodal response, to generate client device output,
      wherein the sensor data from the one or more sensors of the multimodal client device indicate a current client device modality of the multimodal client device,
      wherein the current client device modality is one of a plurality of discrete client device modalities available for the multimodal client device,
      wherein the sensor data is in addition to any sensor data generated by the one or more instances of user interface input,
      wherein the multimodal response includes components of output for the client device action for the plurality of discrete client device modalities,
      wherein the multimodal response is received by the multimodal client device from a remote server,
      wherein generating the client device output is done by the multimodal client device, and
      wherein the components of output include at least (a) a core message component representing information to render for each of the plurality of discrete client device modalities and (b) one or more modality dependent components each representing corresponding information to render for one or more of the plurality of discrete client device modalities;
   causing the client device output to be rendered by one or more user interface output devices of the multimodal client device;
   while at least part of the client device output is being rendered by the one or more user interface output devices of the multimodal client device:
      detecting a switch of the multimodal client device, based on alternative sensor data from the one or more sensors of the multimodal client device, from the current client device modality to a discrete new client device modality;
      in response to detecting the switch, generating alternative client device output based on processing (1) the alternative sensor data from the one or more sensors of the multimodal client device and (2) the multimodal response, using the machine learning model; and
      causing the alternative client device output to be rendered by the one or more user interface output devices of the multimodal client device.

2. The method of claim 1, wherein the multimodal response is received by the multimodal client device from the remote server in response to a request, transmitted to the remote server by the client device, that is based on the user interface input, and wherein determining the current client device modality of the multimodal client device is by the multimodal client device and occurs after transmission of the request.

3. The method of claim 1,
   wherein the client device output includes audible output rendered via at least one speaker of the one or more user interface output devices of the multimodal client device and visual output rendered via at least one display of the one or more user interface output devices,
   wherein the alternative client device output lacks the visual output, and
   wherein causing the alternative client device output to be rendered by the multimodal client device comprises ceasing rendering of the visual output by the at least one display.

4. The method of claim 1, wherein the current client device modality is a voice only interaction and the client device output is rendered via one or more speakers of the one or more user interface output devices.

5. The method of claim 1, wherein the current client device modality is a voice forward interaction, the core message component of the client device output is rendered via only one or more speakers of the one or more user interface output devices, and the one or more modality dependent components of the client device output are rendered via a touch screen of the one or more user interface output devices.

6. The method of claim 1, wherein the current client device modality is a multimodal interaction, the client device output is rendered via one or more speakers and via a touch screen of the one or more user interface output devices.

7. The method of claim 1, wherein the current device modality is a visual forward interaction, the core message component of the client device output is rendered via only a touch screen of the one or more user interface output devices, and the one or more modality dependent components of the client device output are rendered via one or more speakers of the one or more user interface output devices.

8. The method of claim 1, wherein the current device modality is a visual only interaction, and the client device output is rendered via only a touch screen of the one or more user interface output devices.

9. A multimodal client device, comprising:
one or more microphones;
one or more sensors that are in addition to the one or more microphones;
one or more speakers;
one or more displays;
memory storing instructions;
one or more processors executing the instructions to perform the method of:
  determining a client device action based on one or more instances of user interface input provided by a user of the multimodal client device;
  processing, using a machine learning model, (1) sensor data from the one or more sensors of the multimodal client device and (2) a multimodal response, to generate client device output,
    wherein the sensor data from the one or more sensors of the multimodal client device indicate a current client device modality of the multimodal client device,
    wherein the current client device modality is one of a plurality of discrete client device modalities available for the multimodal client device,
    wherein the sensor data is in addition to any sensor data generated by the one or more instances of user interface input,
    wherein the multimodal response includes components of output for the client device action for the plurality of discrete client device modalities,
    wherein the multimodal response is received by the multimodal client device from a remote server,
    wherein generating the client device output is done by the multimodal client device, and
    wherein the components of output include at least (a) a core message component representing information to render for each of the plurality of discrete client device modalities and (b) one or more modality dependent components each representing corresponding information to render for one or more of the plurality of discrete client device modalities;
  causing the client device output to be rendered by one or more user interface output devices of the multimodal client device;
  while at least part of the client device output is being rendered by the one or more user interface output devices of the multimodal client device:
    detecting a switch of the multimodal client device, based on alternative sensor data from the one or more sensors of the multimodal client device, from the current client device modality to a discrete new client device modality;
    in response to detecting the switch, generating alternative client device output based on processing (1) the alternative sensor data from the one or more sensors of the multimodal client device and (2) the multimodal response, using the machine learning model; and
    causing the alternative client device output to be rendered by the one or more user interface output devices of the multimodal client device.

10. The multimodal client device of claim 9, wherein the multimodal response is received by the multimodal client device from the remote server in response to a request, transmitted to the remote server by the client device, that is based on the user interface input, and wherein determining the current client device modality of the multimodal client device is by the multimodal client device and occurs after transmission of the request.

11. The multimodal client device of claim 9,
wherein the client device output includes audible output rendered via at least one speaker of the one or more user interface output devices of the multimodal client device and visual output rendered via at least one display of the one or more user interface output devices,
  wherein the alternative client device output lacks the visual output, and
  wherein causing the alternative client device output to be rendered by the multimodal client device comprises ceasing rendering of the visual output by the at least one display.

12. The multimodal client device of claim 9, wherein the current client device modality is a voice only interaction and the client device output is rendered via one or more speakers of the one or more user interface output devices.

13. The multimodal client device of claim 9, wherein the current client device modality is a voice forward interaction, the core message component of the client device output is rendered via only one or more speakers of the one or more user interface output devices, and the one or more modality dependent components of the client device output are rendered via a touch screen of the one or more user interface output devices.

14. The multimodal client device of claim 9, wherein the current client device modality is a multimodal interaction, the client device output is rendered via one or more speakers and via a touch screen of the one or more user interface output devices.

15. The multimodal client device of claim 9, wherein the current device modality is a visual forward interaction, the core message component of the client device output is rendered via only a touch screen of the one or more user interface output devices, and the one or more modality dependent components of the client device output are rendered via one or more speakers of the one or more user interface output devices.

16. The multimodal client device of claim 9, wherein the current device modality is a visual only interaction, and the client device output is rendered via only a touch screen of the one or more user interface output devices.

* * * * *